J. C. SHARP.
LUBRICATED BUSHING UNIT.
APPLICATION FILED AUG. 19, 1920.
1,386,960.
Patented Aug. 9, 1921.
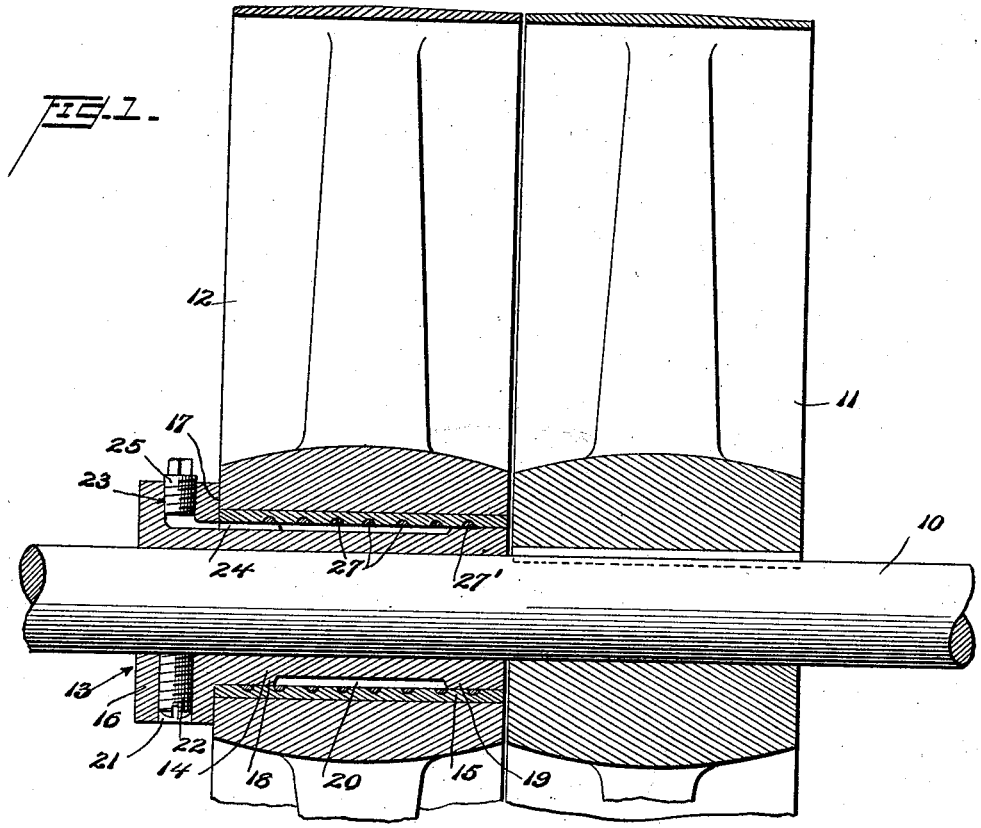
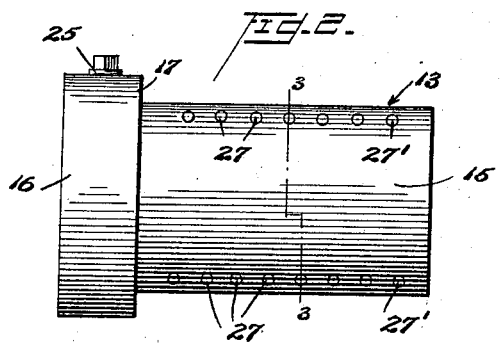
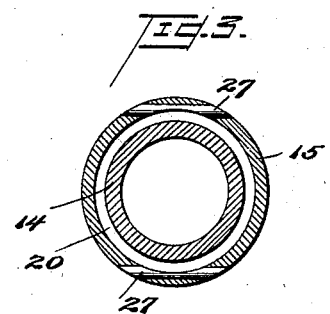
Inventor
John Cessna Sharp
By C. J. Stockman
Attorney

UNITED STATES PATENT OFFICE.

JOHN CESSNA SHARP, OF CHATTANOOGA, TENNESSEE, ASSIGNOR TO MOCCASIN BUSHING COMPANY, OF CHATTANOOGA, TENNESSEE, A COPARTNERSHIP CONSISTING OF JOHN CESSNA SHARP, JOHN S. POINDEXTER, AND WILLIAM F. WARD.

LUBRICATED-BUSHING UNIT.

1,386,960.  Specification of Letters Patent.  Patented Aug. 9, 1921.

Application filed August 19, 1920. Serial No. 404,661.

*To all whom it may concern:*

Be it known that I, JOHN CESSNA SHARP, a citizen of the United States, residing at Chattanooga, in the county of Hamilton and State of Tennessee, have invented certain new and useful Improvements in Lubricated-Bushing Units, of which the following is a specification.

This invention relates to a lubricated bushing unit, and particularly to such a unit designed for mounting loose pulleys upon shafts in such a manner that the unit will revolve with the shaft but will permit the pulley to revolve thereon.

Reference is had to my companion application entitled lubricated bushing unit, executed on even date herewith, in which is shown and claimed a lubricated bearing comprising a plurality of stout, hollow, cylindrical members, one mounted upon the other, and having their adjacent surfaces spaced apart between their ends to form an intermediate oil chamber, and with their ends in oil tight relationship.

The invention consists generally of a bushing or bearing unit composed of a spool member and a sleeve member correlated to form an oil chamber between them, means being provided for supplying oil to the said chamber and for filtering and economically feeding in a thin film of the said oil to the outer or bearing surface of the sleeve member. The members are in the general form of stout, metal sleeves or cylinders, the bushing member being mounted upon the spool member in practically a permanent manner with their ends in oil tight relationship, and with the space between the spool ends constituting an oil chamber, to which oil is supplied in quantity and from which it is fed in a thin film to the bearing surface of the bushing member. In connection with this unit means are provided for attaching the same to the shafting upon which it is used.

It has for its object the production of a lubricated bushing which is designed for marketing as a unit and used as a means for mounting pulleys and the like upon shafting. In such bushings it is necessary to provide a stout and approximately rigid construction, which will be durable in use and which will provide an oil chamber, in which the oil will be effectually retained during transportation or storage, and from which the oil is filtered and fed while in use, in a thin film to the bearing surface, resulting in a decided economy of lubricant and in a considerable saving of time usually required for filling and refilling of bearings now in general use. It has for a further object the provision of a lubricated bushing capable of use with standard forms of pulleys, and in which the parts when assembled form an inclosed lubricant chamber and are practically permanently attached to each other and will not be displaced by any conditions of usage, storage and transportation. A still further object is the provision of a lubricated pulley bushing which may be placed upon the market for replacement of less efficient bushings now in use, demanding little or no change in the construction of standard forms of pulleys with which it is used. Another object is the adjustability of the bearing along the shaft without removing the parts of the bearing or its removal from the pulley. A further object is the production of a bushing for a loose pulley mounted to revolve with the drive shaft and in which advantage is taken of any centrifugal action to promote lubrication of the pulley bearing surface.

Other objects and advantages of the invention will hereinafter appear in the following description and the novel features thereof will be particularly pointed out in the appended claims.

In the drawings, wherein like parts are indicated by like reference characters throughout the several figures, Figure 1 shows a pair of fixed and loose pulleys mounted upon a shaft, the loose pulley being provided with a bearing embodying the invention of this application and showing the same in longitudinal section, Fig. 2 is an elevation of the bushing, and Fig. 3 is a transverse section through the bushing taken on the line 3—3 of Fig. 2.

The numeral 10 represents a section of a shaft upon which is keyed in the usual manner a fixed pulley 11. The loose pulley is designated by 12, while 13 indicates the bushing as a whole.

The bushing unit comprises two members, a sleeve 14 and a bushing proper 15. The sleeve 14 is made of any suitable material, and the bore thereof is of a diameter to slidably fit upon some standard size of shafting so that no difficulty will be experienced in shifting the same longitudinally thereof as may be required in the mounting or in the adjustment thereof. It is provided with a flange 16 at one end thereof, the inner face of which is machined for a purpose hereinafter set forth. Between its ends the sleeve has a portion of less diameter than its ends, defining ribs 18 and 19 and an intermediate oil chamber 20. If the bearing is designed for a very wide pulley, other ribs may be provided intermediate the ribs 18 and 19 to give additional support to the bushing, in which case suitable communicating grooves or passages are provided in the said ribs to connect the sections of the oil chamber as it will then be constituted.

In the flange 16 is formed a threaded aperture 21 for the reception of the set screw 22, designed to secure the bushing unit to the shaft at any desired position along its length. The flange 16 is also provided with a threaded recess 23, which is in communication with the lubricant chamber 20 by means of the conduit 24 formed in the flange and in the rib 18. The recess and communicating conduit constitute the means provided for supplying lubricant to the oil chamber 20. The recess is closed by means of a plug 25, which it will be noted approximately fills the recess 23, so that no space is left for the entrainment of lubricant.

The bushing 15 is a cylinder, provided with a suitable number of transverse bores, which are disposed therein substantially tangentially to the inside diameter of the cylinder, which bores are filled with inserts or feeders 27, made of any suitable material, wood cut longitudinally of the grain being preferred. This member is the same as that described and claimed in my Patent No. 1,113,143 dated October 6, 1914.

The ribs 18 and 19 are of approximately the same diameter as the inner diameter of the bushing 15, and the end of the bushing is carefully machined to fit the face 17 of the flange 16. The two parts of the bearing unit are assembled by driving or pressing the member 15 upon the member 14 until the end of the cylinder or bushing is in oil tight contact with the face of the flange, at which time there is an oil tight joint between the ribs and the inner face of the cylinder, producing an intermediate oil chamber 20 which will effectually retain the lubricant and prevent wastage thereof. By the method of assembling set forth, the parts are practically permanently attached to each other.

When the parts are thus assembled, oil may be introduced into the recess 23 until the oil chamber is filled and the plug 25 screwed into place, when the bearing unit is ready to be placed within the hub bore of the pulley and upon the shaft where it is fastened in place in proximity to the hub of the fixed pulley. It will be noted that the loose pulley is held upon the bearing unit by means of the hub of the fixed pulley and the flange 16 of the sleeve. While the shaft and fixed pulley are being driven, the bearing will be rotating with the shaft, and the lubricant in the chamber 20 subjected to such centrifugal action as is present, which aids the outward feed of lubricant to the bearing surface of the bushing. When the loose pulley is carrying the belt, the bushing lies idle with the shaft and the lubricant is not subjected to any centrifugal action but is free to feed by capillarity to the bearing surface. Since the feed is outward from the axis of the rotating drive shaft, in no condition of use does centrifugal force operate to retard the flow of lubricant through the inserts 27.

It will be noted that the insert 27' is located beyond the chamber 20 and does not communicate therewith. This insert will absorb any excess oil which may creep toward the end of the bearing, and assist in its distribution around the bearing.

My invention provides a construction of bushing unit, which may be made up in the factory in quantity, and in sizes to accommodate standard pulleys and shafting, and if found desirable the lubricant may be placed within the oil chamber at the time of shipment without danger of loss of lubricant during transportation or storage. The wooden inserts while effectually retaining the oil within the chamber of the unit will permit its proper feeding to the bearing surface when in use. By the use of stout, hollow, metal members a durable and rigid bushing is formed, and by pressing one of the members upon the other, a construction is provided in which the parts are permanently held together under all conditions of transportation, storage or use.

Having described my invention, what I claim as new and desire to secure by Letters Patent is:

1. A bearing unit comprising a spool-shaped sleeve member, a bushing member having an outer bearing surface mounted upon said sleeve member and forming therewith an annular oil chamber, means for supplying oil to said chamber, and means for feeding said oil from said chamber to the bearing surface of said bushing.

2. A bearing unit comprising a spool-shaped sleeve member, a bushing member having an outer bearing surface mounted upon said sleeve member and forming therewith an intermediate oil chamber, means for supplying oil to said chamber, means for feeding oil to said bearing surface from said chamber, and means for securing said bearing to a shaft.

3. A bearing unit comprising a sleeve having a portion of its outer surface between its ends of less diameter than its ends to form an intermediate space, a hollow cylinder having an outer bearing surface mounted upon said sleeve and forming with the ends thereof oil tight joints and with said intermediate space an annular lubricant chamber, means for introducing lubricant into said chamber, and means for feeding said lubricant to the outer bearing surface of said cylinder.

4. A bearing unit comprising a sleeve provided with a plurality of ribs defining a space intermediate its ends of less diameter than said ribs, a flange at one end of said sleeve, a cylinder mounted upon said sleeve and forming with said intermediate space an annular oil chamber and with said ribs and said flange oil tight joints, means for introducing lubricant into said oil chamber, and means for feeding said oil through said cylinder to the bearing face thereof.

5. A bearing unit for mounting pulleys upon shafts, comprising a sleeve member provided with a flange at one end and a section between its ends of less diameter than the ends, defining ribs and an intermediate lubricant space, a bushing mounted upon said sleeve and forming with said ribs and the face of said flange oil tight joints, means for introducing lubricant into said chamber, means for feeding the lubricant through said bushing to the bearing face thereof, and means for securing said bushing to a shaft.

In testimony whereof I affix my signature.

JOHN CESSNA SHARP.